(12) United States Patent
Irby et al.

(10) Patent No.: US 7,243,427 B2
(45) Date of Patent: *Jul. 17, 2007

(54) WHEEL RECONDITIONING STATION

(75) Inventors: Patrick A. Irby, Huntington Beach, CA (US); Jason R. Irby, Huntington Beach, CA (US)

(73) Assignee: United Wheel Techs, Inc., Huntington Beach, CA (US)

( * ) Notice: Subject to any disclaimer, the term of this patent is extended or adjusted under 35 U.S.C. 154(b) by 327 days.

This patent is subject to a terminal disclaimer.

(21) Appl. No.: 10/877,123

(22) Filed: Jun. 25, 2004

(65) Prior Publication Data

US 2005/0039328 A1 Feb. 24, 2005

Related U.S. Application Data

(60) Provisional application No. 60/496,275, filed on Aug. 19, 2003.

(51) Int. Cl.
*B21D 53/32* (2006.01)
*B60B 29/00* (2006.01)

(52) U.S. Cl. .................. 29/894.381; 414/427

(58) Field of Classification Search ............... 29/802, 29/402.01, 402.04, 527.4, 894.381, 894.37, 29/894.35; 15/53.4; 104/26.1; 414/427, 414/426, 433
See application file for complete search history.

(56) References Cited

U.S. PATENT DOCUMENTS

| | | |
|---|---|---|
| 3,843,000 A | 10/1974 | Bennett |
| 4,009,499 A | 3/1977 | Casler et al. |
| 4,532,665 A | 8/1985 | Evans et al. |
| 5,161,281 A | 11/1992 | Hanen |
| 5,197,191 A | 3/1993 | Dunkman et al. |
| 5,499,524 A | 3/1996 | Len |
| 5,513,938 A | 5/1996 | Chambers |
| 6,217,424 B1 | 4/2001 | Stephens |
| 6,347,444 B1 | 2/2002 | Pittman |
| 6,367,303 B1 | 4/2002 | Hizono |
| 7,018,156 B2 * | 3/2006 | Irby et al. .................. 414/427 |

* cited by examiner

*Primary Examiner*—John C. Hong
(74) *Attorney, Agent, or Firm*—Fulwider Patton LLP

(57) ABSTRACT

The present invention provides a compact and portable wheel reconditioning station that enables a technician to rotate and index a wheel while a tire is mounted thereto and while the wheel remains mounted on a vehicle. The device allows a technician to quickly and easily rotate or reposition a wheel by depression of a foot pedal to leave his hands free to manipulate the various tools that are used during the reconditioning process.

11 Claims, 5 Drawing Sheets

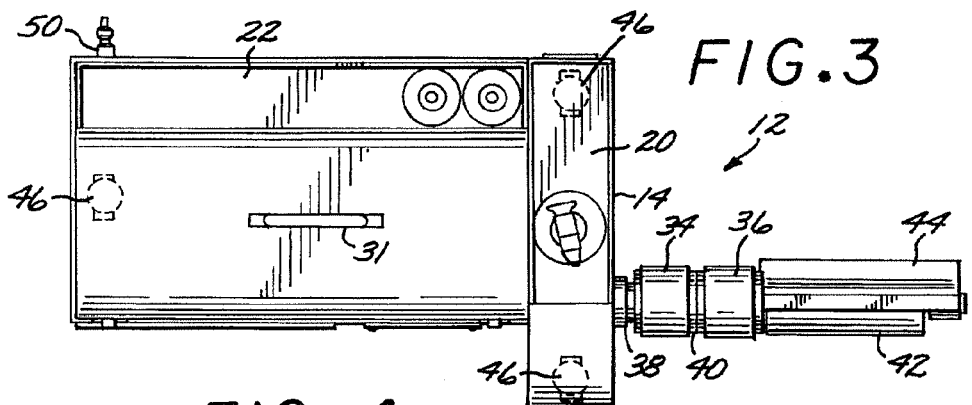
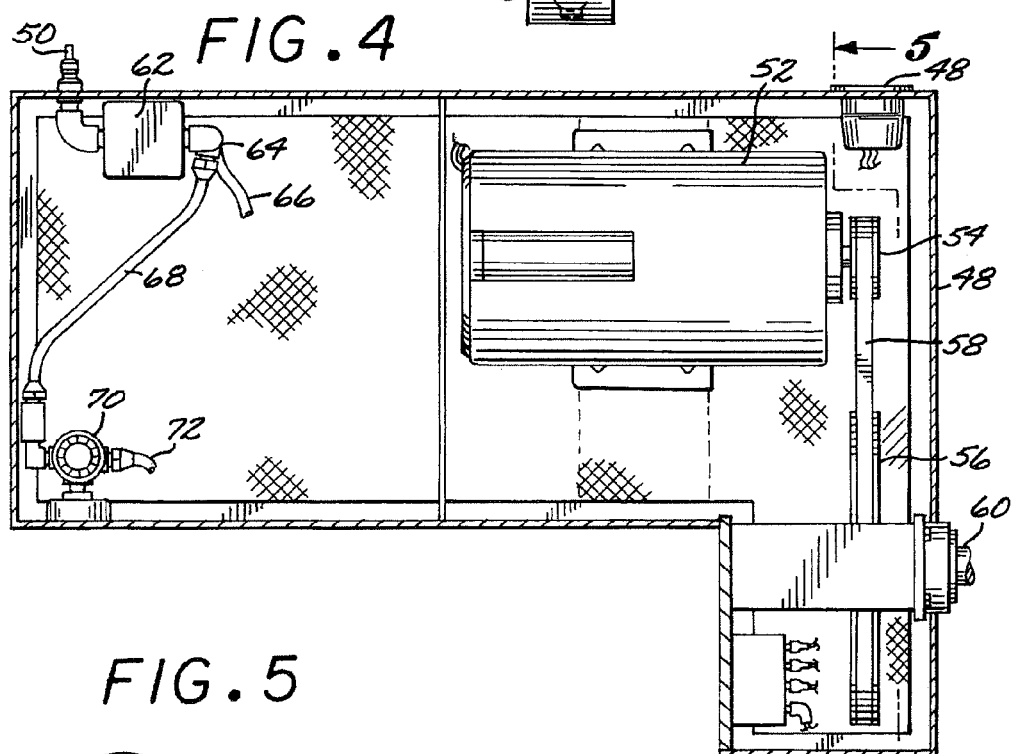
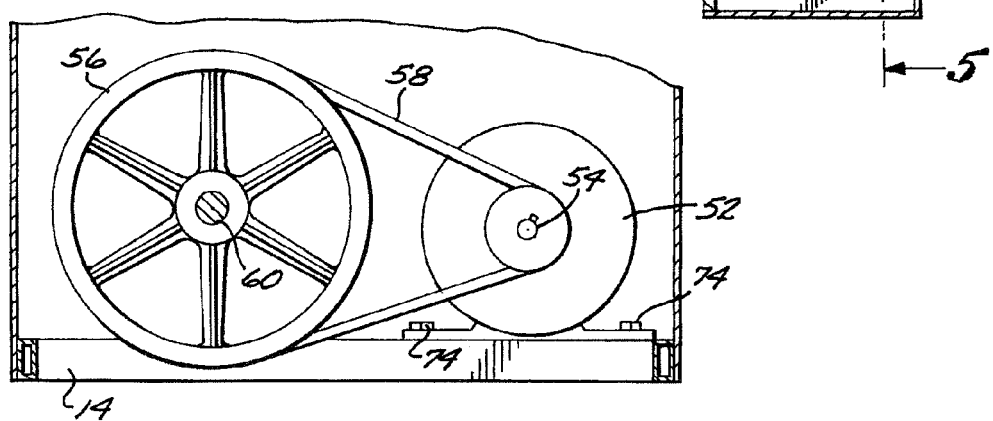

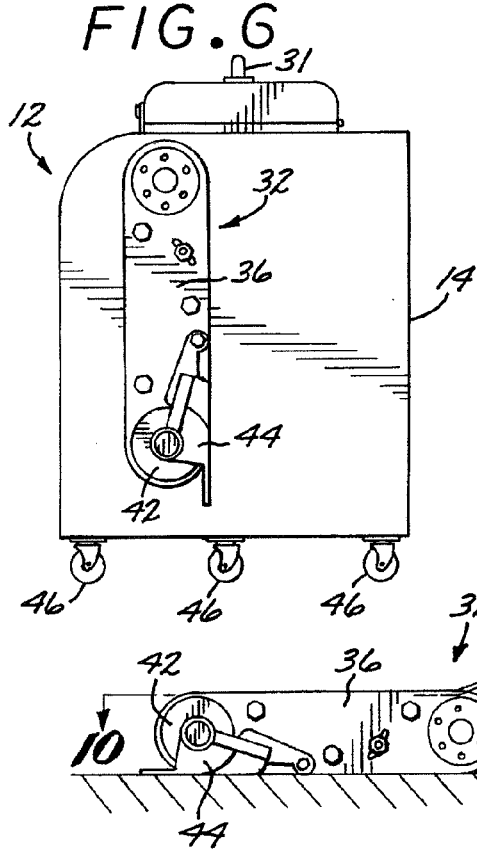
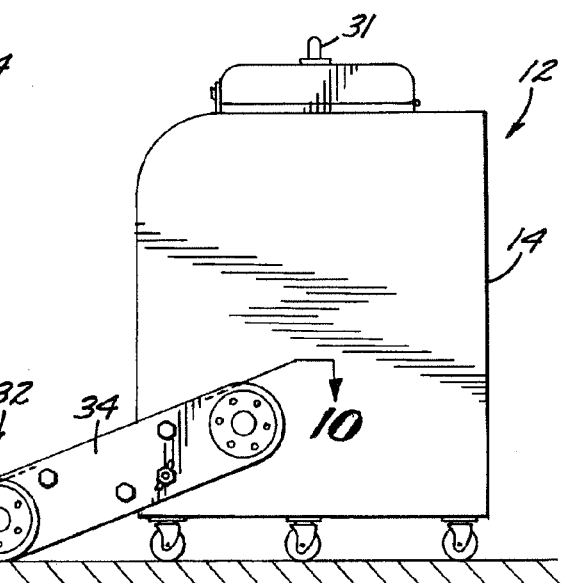
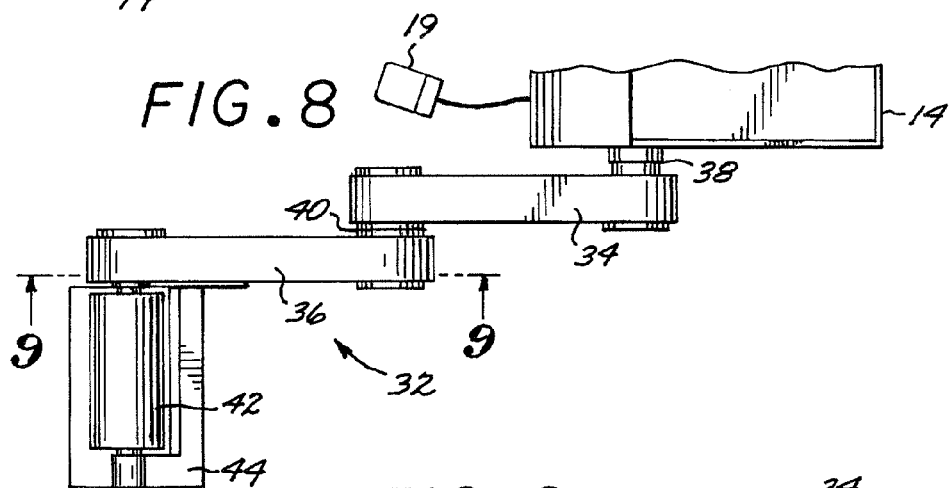
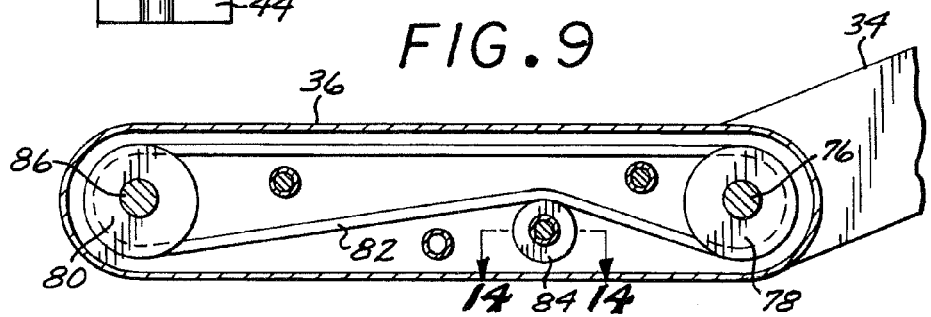

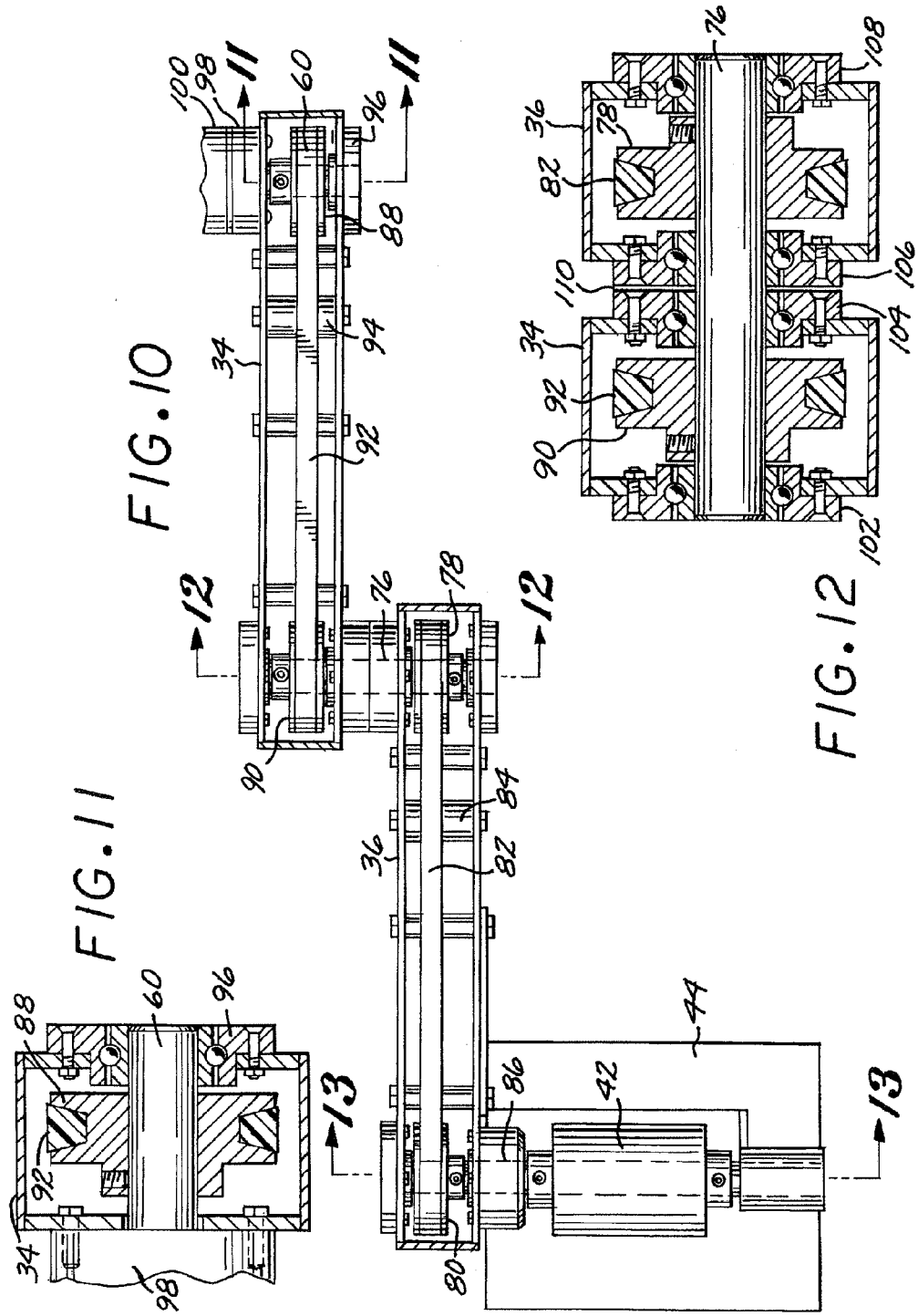

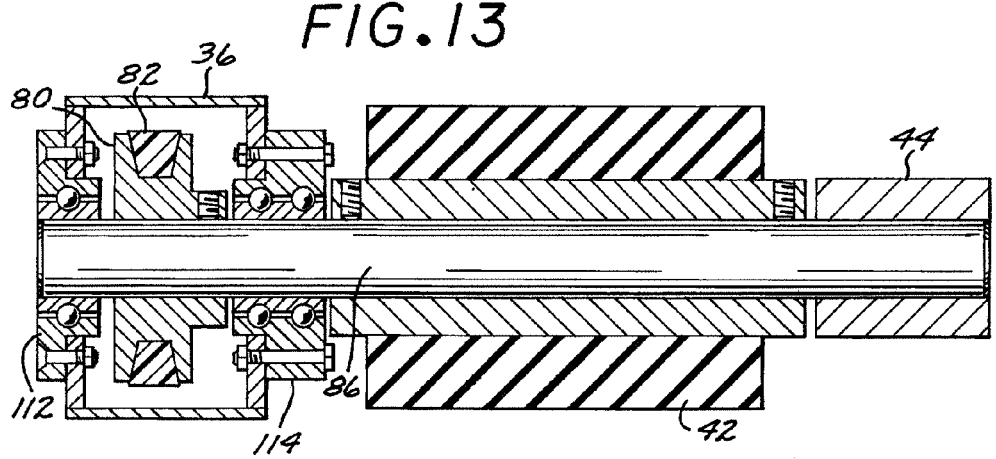
FIG.13
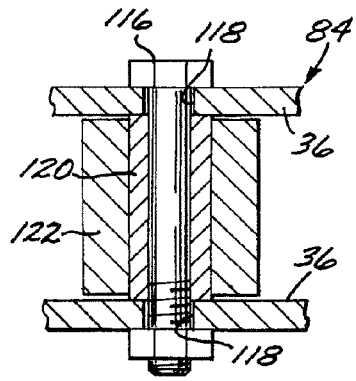
FIG.14
FIG.15
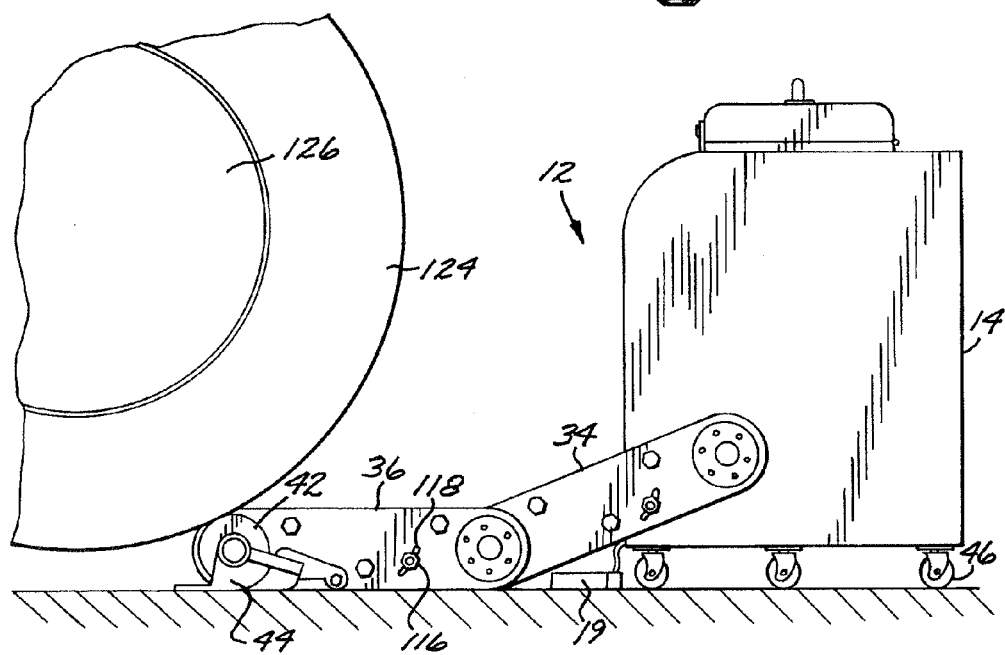

WHEEL RECONDITIONING STATION

CROSS REFERENCE TO RELATED APPLICATION

This is a non-provisional application claiming priority to provisional application No. 60/496,275, entitled Wheel Indexing and Rotating Apparatus, filed on Aug. 19, 2003, which is hereby incorporated by reference in its entirety.

BACKGROUND OF THE INVENTION

The present invention generally relates to the reconditioning or custom painting of an automotive road wheel while the wheel remains attached to an automobile and while the wheel has a tire mounted thereon. More particularly, the invention pertains to a compact and portable workstation that enhances a technician's ability to recondition such wheel as well as to methods for reconditioning the wheel using such workstation.

Automotive road wheels are easily damaged such as for example by contact with a curb during parking maneuvers, incompatibility with automatic carwash equipment or by the careless mounting or dismounting of a tire. While the damage that results is usually not structural it is nonetheless unsightly and detracts from the overall appearance and potentially the value of the vehicle. A demand therefore exists for the ability to relatively quickly and easily repair such damage. Obviating the need to dismount the wheel from the vehicle, let alone the tire from the wheel, substantially reduces the amount of time and labor involved.

The reconditioning of a damaged wheel typically requires the damaged area to be ground down, blended into the adjacent areas and then refinished which may require the polishing or painting of the wheel. Paining in turn may in turn require the sequential application of any of various materials such as for example primers, adhesion promoters, color coats and possibly clear coats. The various tools that must be brought to bear against the wheel to perform such operations often require a certain orientation between tool and wheel so as to optimize the desired effect and it is typically more efficient and effective to bring the wheel into position relative to the tool rather than vice versa.

Additionally, since repair technicians tend to travel to various jobsites rather than to operate out of a fixed repair facility, it is most desirable for the various tools and equipment that are needed to be assembled in a compact and easily transportable form that allows for quick and easy set up as well as restowing. Additionally, it is most desirable for all of the tools and materials that are needed to be arrayed in an organized, readily accessible fashion so as to enable the technician to effect the repair as quickly and easily as possible.

A need therefore exists for a reconditioning station that can simultaneously serve all of these needs. Such station should readily avail all of the tools and materials that may be needed by a technician to grind, polish, clean and refinish a damaged section of a wheel. Moreover, the station should facilitate the reconditioning of a wheel while such wheel remains attached to a vehicle and while a tire remains mounted thereto by enabling a technician to control the rotational orientation of the wheel while leaving the technician's hands free to manipulate any of the various tools that are used in the reconditioning process. Finally, the reconditioning station should be compact so as to be readily portable yet quickly deployable upon arrival at a jobsite.

INVENTION SUMMARY

The reconditioning station of the present invention comprises a compact and portable device that is quickly and easily deployable to engage a tire surface and rotate the wheel and tire. Additionally, the station may be configured to provide ready access to all of the various tools and materials that are needed by a technician to effect a wheel repair. The drive roller is optionally fitted to the distal end of an articulating arm so as to render the station compact while in its stowed configuration yet capable of engaging a wide variety of vehicle wheels including wheels mounted to low slung automobiles with limited access. The method of the present invention comprises generally the use of a powered roller to effect a wheel repair and more particularly, the use of the fully configured workstation as described herein to most efficiently effect such repair.

In its most rudimentary form, the reconditioning station includes a chassis that supports a drive roller as well as a motor that powers the drive roller which is controllable so as to enable a technician to rotate and index a wheel by hands-free operation. The term "hand-free" operation is used to connote that both hands remain free to manipulate the various tools that are brought to bear on the wheel surface. A footpedal may be fitted for such purpose, configured to control rotation by either simply turning the motor on and off or causing the motor to engage and disengage the roller or further providing the capability of controlling the direction of rotation and/or the speed of rotation. Alternatively, a hand pendent may be provided to allow the speed of rotation and position of the wheel to be controlled with a finger or thumb. Such configuration does not compromise a technician's ability to manipulate the tool being used to work wheels surface as both hands still remain substantially free to perform such tasks.

The reconditioning station of the present invention may be configured to include a chassis which in addition to supporting a drive motor, includes input ports for receiving electrical power as well as a flow of compressed air, compressed air output ports for supplying compressed air at different pressures, and storage compartments configured to maintain the various tools and materials that are needed during the reconditioning process in an organized and readily accessible fashion. The station may also include an articulating arm that unfolds from the station so as to cause a drive roller to engage the surface of tire mounted to a wheel and wherein such articulating arm transfers rotation from the drive motor to the roller. Alternatively, the arm may be configured to telescope outwardly from the workstation. A footpedal, with which the operation of the motor and hence the rotation of the wheel is controlled, is stored within the work station and is readily extendible therefrom when needed. The footpedal may also be relied upon to control the speed of rotation wherein speed is a direct function of the depth to which the pedal is depressed.

The articulating arm has a proximal member and a distal member. The drive roller extends laterally from the distal end of the distal member and includes an anchoring cradle which engages the ground upon deployment of the arm so as to support the drive roller under the weight of the wheel and tire combination placed thereon as well as prevent the roller and hence the arm and reconditioning station from shifting as torque is applied to the wheel by the drive roller. The cradle additionally serves the function of locking the arm in its folded position during transport of the reconditioning station. The reach and lateral offset of the arm allows a powerful drive motor to be used without compromising the ability of the device to engage a wheel and tire combination mounted to a vehicle with limited accessibility.

The various tools that are needed during the reconditioning process may include a pneumatic grinder, abrader, polisher or other metal working power tool wherein such tools require a fairly high pressure as well as an airbrush for use during the painting steps which requires an air supply at a substantially lower pressure. Separate pneumatic output ports within the station obviate the need for disconnecting and reconnecting different tools during the reconditioning process and for readjusting a pressure regulator to accommodate the different pressure requirements.

The method of the present invention initially requires the corner of the vehicle with the wheel in need of repair to be jacked up slightly, after which the drive roller is positioned thereunder and the vehicle is lowered thereonto so that the tire exerts a slight pressure on the drive roller. By actuating the footpedal or hand pendent, the technician can quickly and easily index a wheel into a desired position to most effectively access a damaged area with a particular power tool or can rotate the wheel while such powertool is being applied to a particular wheel surface to enable the creation of a smooth transition from the repaired area to the rest of the wheel. The ability to rotate and/or index the wheel via hands-free control greatly simplifies and expedites the various grinding, polishing, cleaning, masking and finishing operations. The variable speed control allows the speed of rotation to be tailored to the requirements of a particular reconditioning step.

The fully configured reconditioning station that includes the articulating arm and the storage capacity further expedites the reconditioning process. After transportation of the device to the jobsite, the device is hooked up to a remote source of electrical power and compressed air and the articulating arm is unfolded. The corner of the vehicle with the wheel in need of repair is jacked up slightly, the drive roller is positioned thereunder and the vehicle is lowered thereonto so that the tire exerts a slight pressure on the drive roller. The various pneumatic tools, already connected to their respective sources of compressed air are then extracted from their storage compartments and the permanently wired footpedal is retrieved from its storage compartment. As such, the configuration of the workstation requires only a minimal number of interconnections to be made which enables a technician to be ready to commence a repair within a very few minutes after arriving at a jobsite.

Because the consumables, e.g. the cleaners, adhesion promoters, paints and even rags are maintained by the workstation within easy reach of the technician, the reconditioning process can proceed at a rapid pace. After the repair is complete, the air tools and footpedal are restowed in their respective compartments and the station is disconnected from the air and power sources. A quick jacking of the wheel allows the drive roller and arm to be extracted from thereunder and the arm to be folded into its compact configuration against the station after which the entire station can be lifted into the technician's truck for transport to the next jobsite.

These and other features of the present invention will become apparent from the following detailed description of a preferred embodiment which, taken in conjunction with the accompanying drawings, illustrates by way of example the principles of the invention.

BRIEF DESCRIPTION OF THE DRAWINGS

FIG. 3 is a top plan view of the station shown in FIG. 1;

FIG. 4 is a slightly enlarged, cross-sectional view taken along lines 4—4 of FIG. 1;

FIG. 5 is a cross-sectional view taken along lines 5—5 of FIG. 4;

FIG. 6 is a side plan view of the station shown in FIG. 1;

FIG. 7 is a side plan view of the station shown in FIG. 6 with its articulating arm in its deployed position;

FIG. 8 is a top plan view of the articulating arm in its deployed position;

FIG. 9 is a slightly enlarged, cross-sectional view taken along lines 9—9 of FIG. 8;

FIG. 10 is an enlarged cross-sectional view taken along lines 10—10 of FIG. 7;

FIG. 11 is a further enlarged, cross-sectional view taken along lines 11—11 of FIG. 10;

FIG. 12 is a further enlarged, cross-sectional view taken along lines 12—12 of FIG. 10;

FIG. 13 is a further enlarged, cross-sectional view taken along lines 13—13 of FIG. 10;

FIG. 14 is an enlarged, cross-sectional view taken along lines 14—14 of FIG. 9; and FIG. 15 is a side view of the workstation as shown in FIG. 7 engaging a tire mounted to a wheel.

DETAILED DESCRIPTION OF THE PREFERRED EMBODIMENTS

The Figures generally depict a preferred embodiment of the present invention. The device comprises a self-contained wheel reconditioning station that enables a technician to rotate or index the wheel to be reconditioned while leaving the technician's hands free to manipulate any of various handtools that are used during the reconditioning process.

Figure 1:
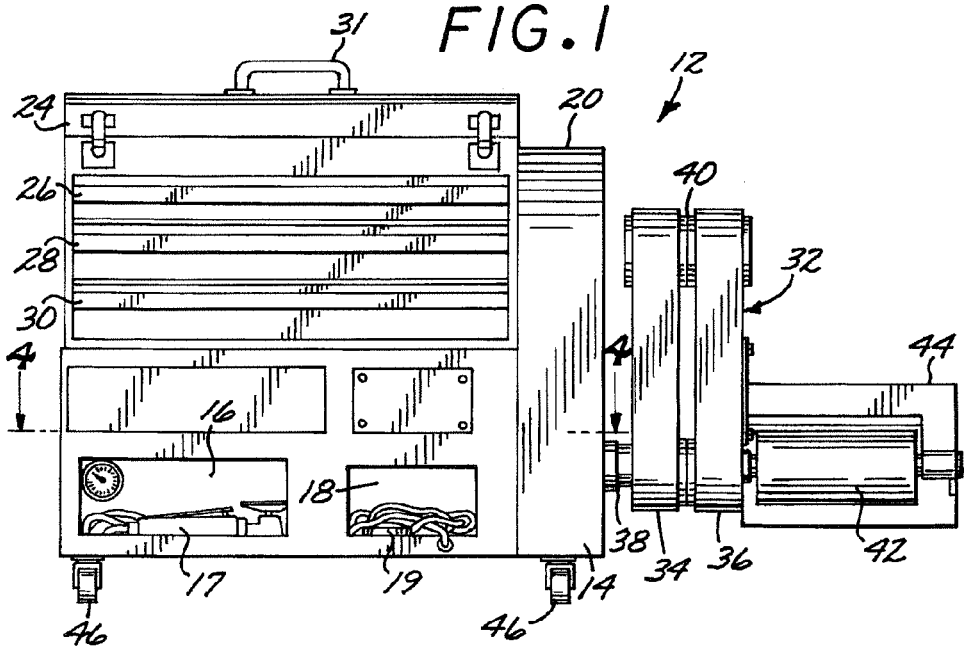
FIG. 1 is front plan view of a reconditioning station embodying the present invention.

FIG. 1 is a front plan view of the of a preferred embodiment of the reconditioning station 12 of the present invention. The reconditioning station 12 shown includes a chassis 14 which defines and/or supports a plurality of storage compartments 16, 18, 20, 22, 24, 26, 28 and 30 and includes an articulating arm 32 that is mounted to one side thereof. Storage compartments 24, 26, 28, 30 can be lifted off of the chassis as a unit wherein grasp handle 31 is jilted for such purpose. When in place, the storage compartments appear integral with the chassis. A rotary grinder 17 and an airbrush (not shown) and associated air hoses may for example may be stored in compartment 16 while a footpedal 19 and associated power cord may be stored in compartment 18. The articulating arm includes a proximal member 34 and a distal member 36. In the preferred embodiment the members 34 and 36 are of identical construction with plates on the opposite sides also being identical for economy of manufacture of inventory. The proximal arm is rotatably mounted to the chassis at 38 while the distal arm is rotatably connected to the proximal arm at 40. A drive roller 42 extends laterally from the distal end of the distal arm 36 and includes a cradle 44 configured to support the roller. A drive roller only one to two inches in length has been found to be effective although a substantially longer roller can also be used. The entire work station is supported by a set of casters 46 that are arranged in a triangular pattern.

Figure 2:
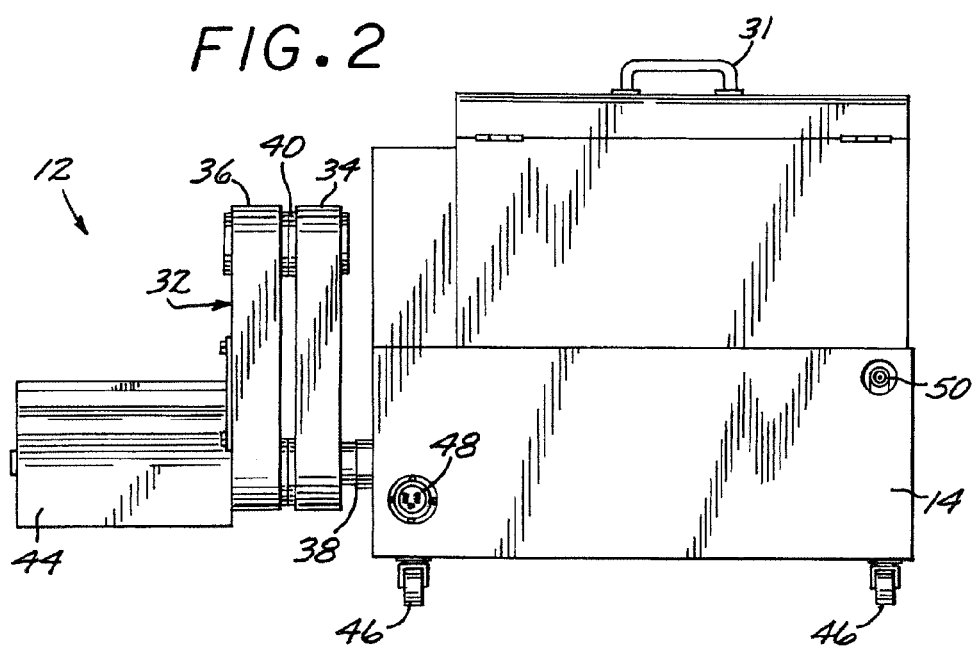
FIG. 2 is a back plan view of the station shown in FIG. 1.

The back plan view of FIG. 2 additionally shows an electrical plug 48 and a pneumatic quick connect coupling 50 to which the work station is hooked up for deployment. Electrical power and compressed air may be available at a worksite or, optionally, a gasoline-powered generator and a compressor can be carried in the bed of a pickup truck that the technician drives to the jobsite. Such generator can be relied upon to supply the electrical power to the workstation as well as to the compressor which in turn supplies compressed air to the workstation.

The top plan view of FIG. 3 provides a view of storage compartments 20 and 22 which may be use to stow various bottles and containers of materials used during the reconditioning process. The triangular arrangement of the casters 46, visible in phantom, imparts stability to the device when traversing and when deployed on uneven ground.

FIG. 4 is a somewhat enlarged, cross-sectional view taken along the lines 4—4 of FIG. 1 showing some of the components accommodated within the chassis 14. Electric drive motor 52 is attached to the base of the chassis. Rotation is transferred from pulley 54 to pulley 56 via drive belt 58 while output shaft 60 transfers rotation to the a pulley system that is arranged within articulating arm 32. The pneumatic coupling 50 is plumbed through a water separator 62 to a bifurcation 64 wherein one branch 66 is available for use by a rotary power tool at an unreduced pressure and a second branch 68 is connected to a pressure regulator 70 to provide for a substantial reduction in pressure. The reduced pressure output 72 is available for use by an airbrush.

FIG. 5 is a cross-sectional view taken along lines 5—5 of FIG. 4 to show the drive motor 52 positively attached to the base of chassis 14 at 74 and the pulley arrangement 54, 56 which serves to reduce rotational speed and increase torque.

FIGS. 6 and 7 respectively, show the articulating arm 32 in its stowed and deployed positions. In its stowed state the articulating arm is confined to a profile within that of the chassis 14. In its deployed state the articulating arm unfolds to reach under the vehicle and orient the drive roller 42 for contact with the tire of a raised wheel. In such position, the distal member 36 extends parallel to the ground while the cradle 44 contacts the ground to provide support for the drive roller. Such configuration completely isolates the chassis 14 from any weight load exerted by a wheel and tire combo on the drive roller and serves to transfer all such loads directly to the ground. Additionally, the cradle prevents the shifting of the arm and hence chassis once torque is applied by the drive roller to the tire.

FIG. 8 additionally shows the lateral offset of the drive roller 42 relative to the chassis 14. Such offset enhances accessibility as the chassis will be less likely to make contact with the vehicle as it is maneuvered into place and as the vehicle's tire is lowered onto the drive roller. The lateral offset additionally serves to eliminate any constraint that would otherwise be imposed on the size and hence power of the drive motor. A large and powerful motor can therefore be used to enable a wheel and tire combination to be spun up to a higher speed more quickly. Also shown is the footpedal 19 that has been removed from its storage compartment 18. The footpedal is preferably configured to provide variable speed control whereby speed is a direct function of the depth to which the pedal is depressed.

FIG. 9 is an enlarged cross-sectional view of the distal member 36 taken along lines 9—9 of FIG. 8. Rotation is transferred from the proximal member 34 of articulating arm 32 by shaft 76 which is coupled to pulley 78. Rotation is in turn transferred to pulley 80 by drive belt 82 that is held in tension by tensioner 84.

FIG. 10 is a cross-sectional view taken along the lines 10—10 of FIG. 7 showing the internal structure of the articulating arm in its deployed position. Drive shaft 60 extends into the proximal end of proximal member 34 of articulating arm 32 to drive pulley 88. Rotation is transferred from pulley 88 to pulley 90 via drive belt 92 which is tensioned by tensioner 94. Pulley 90 is rotationally locked to transfer shaft 76 which in turn is rotationally locked to pulley 78 in distal member 36.

As is visible in the enlarged cross-sectional view of FIG. 11, output shaft 60 is supported by a bearing set 96 at its distal end. A bronze thrust bearing 98 is attached to the proximal member 34 so as to cooperate with complementary thrust bearing 100 that is affixed to the chassis 14.

The cross-sectional view of FIG. 12 illustrates the manner in which transfer shaft 76 is supported by four bearing sets 100, 102, 104 and 106. A bronze thrust washer 110 situated between the carrier housings for adjacent bearing sets 104 and 106 bears the lateral loads.

In the cross-sectional view of FIG. 13, the internal support for drive shaft 76 and drive roller 42 is visible. Bearing sets 112 and 114 support the drive shaft at its proximal end while its distal end is carried by a sleeve formed within cradle 44.

A cross-sectional view of tensioner 84 is shown in FIG. 14. A bolt 116 extends between the walls of distal member 36 and is received within slots 118 that are formed in such walls. The bolt carries a plain bearing 120 which in turn supports a rotatable idler roller 122. By loosening and shifting the bolt within the slots, the tension of the belt can be adjusted. The identical arrangement is used for the tensioner 94 in the proximal member 34.

FIG. 15 shows a preferred embodiment of the reconditioning station 12 of the present invention in its deployed state and in engagement with a tire 124 that is mounted to a wheel 126 which in turn is mounted to a vehicle. In use, this reconditioning is first transported to a job site in its compact stowed form. The compactness and portability of the device easily allows it to be lifted off of for example a pickup truck bed and rolled into position near a vehicle with a wheel in need of repair. In this embodiment, the ability to separate storage compartments 24, 26, 28, 30 from the chassis serves to divide the weight that needs to be lifted. The corner of the vehicle with the damaged wheel is jacked up off the ground. The articulating arm 32 is extended and the station is rolled into place so as to position the drive roller 42 beneath the tire after which a portion of the vehicle weight is lowered onto the drive roller. A compressed air source is attached to the reconditioning station as is a power cord. The technician then pulls the footpedal 19 as well as the power tools 17 out of their respective compartments and is ready to recondition the wheel.

Actuation of the drive roller by depression of the footpedal allows the technician to use both hands to manipulate any of the various tools that are required to recondition the wheel including for example a rotary grinder, polishing pad or other metal working tools. The desired effect may require the indexing of the wheel into a particular position to allow the tool to most advantageously engage the wheel surface. Alternatively, it may be advantageous to rotate the wheel while the tool engages a particular surface. Additionally, rotation and indexing of the wheel is advantageous in any of the other various reconditioning operations that are involved including for example cleaning and preparing the various surfaces, masking various surfaces and machining and then finishing such surfaces.

The ability to vary speed with the footpedal allows the rotational speed of the wheel to be tailored to a particular reconditioning step. A slow rotational speed of about 2 rpm has been found to be useful for inspection and rough grinding. A slightly higher speed of about 5 rpm is useful for smoothly blending the damaged area into the undamaged areas of the wheel while a rotational speed of about 20 rpm is ideal for the smooth application of the various paints and materials used in the finishing operation. A slow rotational speed of about 2 rpm has also been found to be ideally suited for the polishing operation should one be required. At such speed, the wheel surface is advanced past the buffing pad at a rate of little over 1 inch per second. This causes heat to be generated between the buffing pad and the wheel surface which is required for achieving a high quality polished finish. Maintaining a slow and steady rate of the wheel surface of the buffer ensures the generation of steady and even heating to yield the desired mirror-like, uniform finish.

Damage to the outer rim section of a wheel usually occurs annularly—in a ring which can continue around for a full 360 degrees, although, a wheel almost always has varying degrees of damage. For example, multiple sections of damage to the outer rim may be deeply gouged, whereas other sections may be barely scratch or even completely unaffected, suggesting that the wheel was bouncing and stuttering about as it rubbed its way along the curb. The severely damaged sections may each vary in annular length from a fraction of an inch to three inches, ten inches, twenty inches, etc. Therefore, the technician uses the speed control to accelerate and decelerate the rotation of the wheel perhaps several times during each revolution of the wheel in order to keep the work passing by the conditioning tool at the perfect foot per minute speed to optimally condition in the shortest timeframe given the degree of damage. Severe damage will be required to pass-by the conditioning tool many, many times before it has been removed. Speeding through the areas needing less conditioning, while slowing to a crawl at areas needing it more optimizes the efficiency of the reconditioning operation. As the conditioning work proceeds in this acceleration/deceleration mode, damage is reconditioned at optimum efficiency. As the technician sees some damage sections shrink, both in length and width, he gradually speeds-up the entire process. The irregularities begin to assume shape, the slow sections begin coming into time with the quicker sections. Undamaged sections are just sped-thru as quickly as the technician knows he can while still effectively decelerate in time for the upcoming severe sections. At that point some damage begins to disappear altogether, all speeds begin to accelerate and merge, eventually into the optimal foot per minute speed for that respective conditioning operation.

As will be appreciated by those skilled in the art the drive roller speed may alternatively be controlled by, for instance, a selector switch on the control panel coupled with a potentiometer driven by the footpedal or hand pendent or manually by switching the control panel switch to a control panel potentiometer. In a preferred embodiment, the drive motor is configured to rotate the drive roller at a selected speed and the footpedal acts as an on/off switch only. A switch or foot pedal mechanism can be configured to allow for the selection of rotation direction. A preferred control panel configuration would include an on/off power switch, a switch for selecting the operational mode (manual, neutral or hands free), a switch for selecting either momentary operation or variable speed control, a potentiometer for selecting the momentary speed or the maximum speed attainable when using the speed control (footpedal or hand pendent) and a readout of the speed of rotation.

Indexing is also easily accomplished by simply releasing the footpedal when the wheel is rotated into the desired position. The accessibility of the various tools and materials that are needed and the hands-free ability to rotate and index the wheel allows the technician to remain seated during the entire reconditioning process. After the repair is complete the corner of the car is again jacked up to relieve pressure on the drive roller to allow the drive roller to be extracted from under the wheel. The articulating arm is folded and stowed in place rendering the reconditioning station readily portable.

While a particular form of the invention has been described and illustrated, it will also be apparent to those skilled in the art that various modifications can be made without departing from the spirit and scope of the invention. Accordingly, it is not intended that the invention be limited except by the appended claims.

What is claimed is:

1. A device for facilitating the reconditioning of an automotive road wheel while such road wheel remains attached to an automobile and has a tire mounted thereon, comprising:
    a portable chassis;
    a drive mechanism for generating rotation, supported by said chassis;
    a drive roller, rotatably supported by said chassis, rotationally driven by said drive mechanism and configured to engage and rotate a tire mounted to a wheel which is in turn mounted to an automobile; and
    a mechanism for controlling rotation of the drive roller by hands-free operation.

2. The device of claim 1, wherein said drive mechanism comprises an electric motor.

3. The device of claim 1, wherein said mechanism for controlling rotation of said drive roller comprises a foot pedal.

4. The device of claim 3, wherein said footpedal serves as an on and off switch for rotating said drive roller at a preselected speed.

5. The device of claim 3, wherein said footpedal enables adjustment of the rotational speed of said drive roller.

6. The device of claim 1, wherein said control mechanism allows a direction of rotation to be reversed.

7. The device of claim 1, wherein rotation is transferred from said drive mechanism to the drive roller by a drive belt.

8. The device of claim 1, further comprising a cradle configured for transferring load exerted by a tire on said drive roller to the ground so as to support said drive roller and anchor said device.

9. The device of claim 1, wherein said drive roller is capable of rotating an automotive wheel at a rotational speed of up to about 20 rpm.

10. The device of claim 9, wherein said drive roller is capable of rotating said automotive wheel at rotational speeds between 2 rpm and 20 rpm.

11. A device for facilitating the reconditioning of an automotive road wheel mounted on a tire and carried from an automobile hub, comprising:
    a portable chassis;
    drive means mounted on said chassis;
    roller means mounted on said chassis and coupled with said drive means and configured to, upon actuation of said drive means, engage and rotate said wheel; and
    hands free control means for controlling said drive means.

* * * * *